(12) United States Patent
Smith

(10) Patent No.: US 7,789,419 B2
(45) Date of Patent: *Sep. 7, 2010

(54) VEHICLE SEAT ASSEMBLY WITH TWO-PART, CLIPPED AIR BAG GUIDE RETAINER

(75) Inventor: Rodger G. Smith, Ludlow (GB)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/057,703

(22) Filed: Mar. 28, 2008

(65) Prior Publication Data

US 2009/0243263 A1    Oct. 1, 2009

(51) Int. Cl.
B60R 21/20      (2006.01)

(52) U.S. Cl. ............... 280/730.2; 280/728.1; 280/728.2

(58) Field of Classification Search ............. 280/728.1, 280/728.2, 728.3, 730.2
See application file for complete search history.

(56) References Cited

U.S. PATENT DOCUMENTS

| | | | |
|---|---|---|---|
| 5,749,597 A | | 5/1998 | Saderholm |
| 5,816,610 A | | 10/1998 | Higashiura et al. |
| 5,893,579 A | * | 4/1999 | Kimura et al. ............ 280/730.2 |
| 5,927,749 A | | 7/1999 | Homier et al. |
| 5,938,232 A | * | 8/1999 | Kalandek et al. ......... 280/730.2 |
| 5,967,603 A | * | 10/1999 | Genders et al. ......... 297/216.13 |
| 5,988,674 A | * | 11/1999 | Kimura et al. ........... 280/730.2 |
| 5,997,032 A | | 12/1999 | Miwa et al. |
| 6,045,151 A | | 4/2000 | Wu |
| 6,095,602 A | * | 8/2000 | Umezawa et al. ......... 297/216.1 |
| 6,237,934 B1 | | 5/2001 | Harrell et al. |
| 6,357,789 B1 | * | 3/2002 | Harada et al. ............. 280/730.2 |
| 6,364,347 B1 | * | 4/2002 | Holdampf et al. ......... 280/730.2 |
| 6,382,665 B2 | * | 5/2002 | Holdampf et al. ......... 280/730.2 |
| 6,439,597 B1 | * | 8/2002 | Harada et al. ............. 280/728.2 |
| 6,578,911 B2 | * | 6/2003 | Harada et al. ........... 297/216.13 |
| 6,588,838 B1 | | 7/2003 | Dick, Jr. et al. |
| 7,334,811 B2 | * | 2/2008 | Tracht et al. ............. 280/728.3 |
| 7,341,275 B2 | * | 3/2008 | Miyake et al. ........... 280/730.2 |
| 2006/0113761 A1 | | 6/2006 | Tracht |
| 2006/0131848 A1 | | 6/2006 | Miyake et al. |
| 2007/0222190 A1 | * | 9/2007 | Tracht ..................... 280/730.2 |
| 2008/0100044 A1 | * | 5/2008 | Cho ........................ 280/730.2 |
| 2008/0224454 A1 | * | 9/2008 | Tracht ..................... 280/728.3 |

FOREIGN PATENT DOCUMENTS

WO    00/06426 A1    2/2000

* cited by examiner

*Primary Examiner*—Paul N Dickson
*Assistant Examiner*—James English
(74) *Attorney, Agent, or Firm*—Brooks Kushman P.C.

(57) ABSTRACT

In at least certain embodiments, the vehicle seat assembly comprises an air bag guide including a first inner panel, a second inner panel, and an outer panel, with each of the panels being made of flexible material and having forward and rearward extremities, and a rigid plastic connector assembly for releasably securing the first and second inner panels to each other adjacent the air bag assembly, with the rigid connector comprising at least two releasably connected members, and with at least one of the connected members having at least one stop for inhibiting relative lateral movement of the connected members.

20 Claims, 2 Drawing Sheets

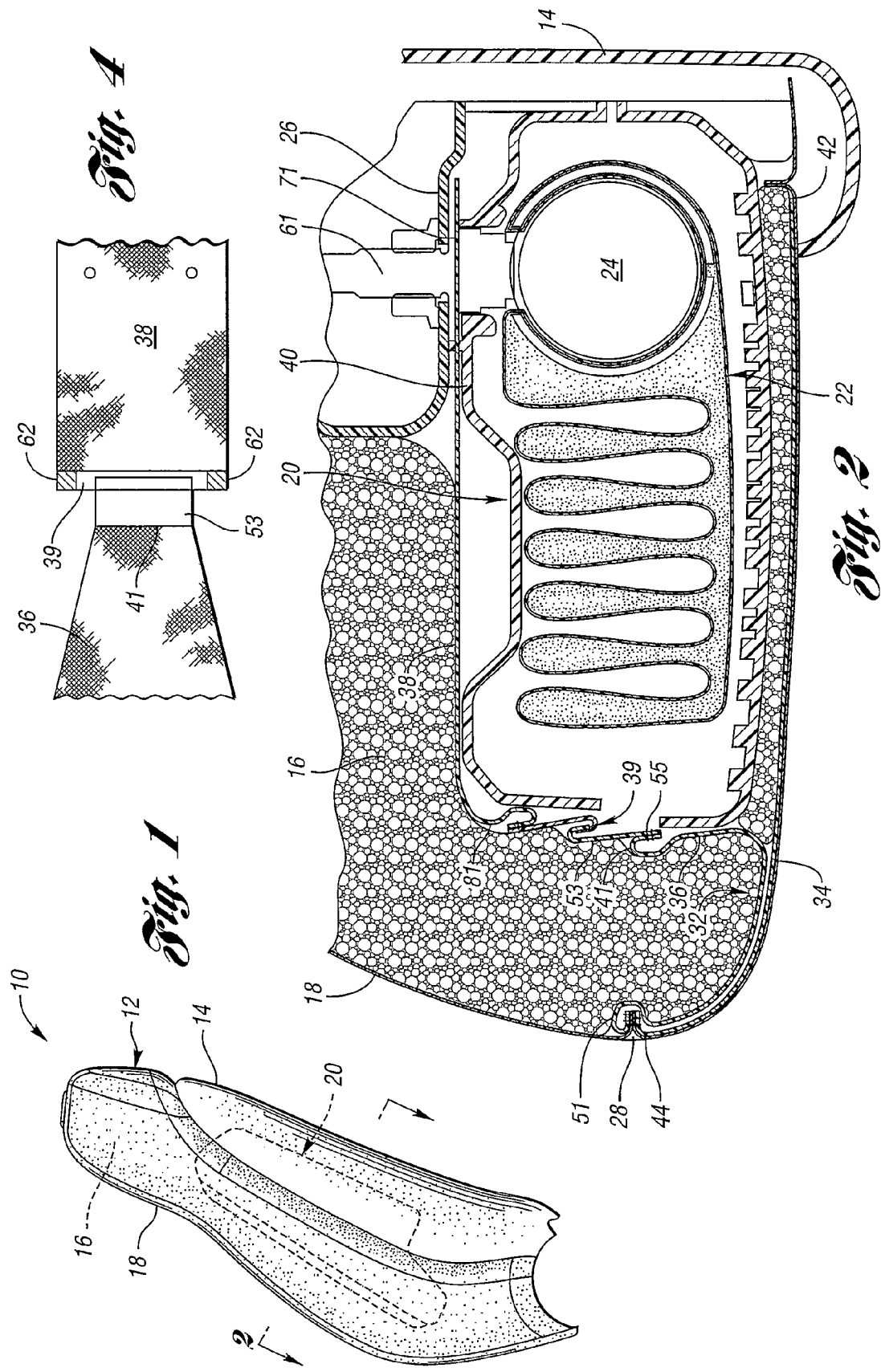

VEHICLE SEAT ASSEMBLY WITH TWO-PART, CLIPPED AIR BAG GUIDE RETAINER

BACKGROUND OF THE INVENTION

1. Field of the Invention

The present invention relates to a vehicle seat assembly, and in particular, a seat assembly including an air bag.

2. Background Art

Vehicles can be equipped with side air bags, which may be in the form of a side air curtain disposed in a headliner of the vehicle, or alternatively, may be an air bag disposed within a vehicle seat assembly. One limitation of air bags that are located within a seat assembly, is that the air bag needs to break through the seating material before it can fully deploy to protect a vehicle occupant. During deployment, such an air bag may encounter foam, or other seat pad materials, and must then break through a seat trim cover in order to escape from the seat assembly. Another limitation is that the air bag should break through the cover material at a predetermined location to optimize effectiveness.

Prior vehicle seat assemblies equipped with side air bags and their manufacturing methods are disclosed in U.S. Pat. Nos. 5,749,597, 5,816,610, 5,927,749, 6,045,151, 6,237,934 and 6,588,838, for example.

SUMMARY OF THE INVENTION

Under the invention, a vehicle seat assembly is provided. In at least one embodiment, the vehicle seat assembly comprises a frame, a seat pad adjacent the frame, a trim cover extending over the seat pad and including a release seam adjacent the seat pad, and an air bag assembly mounted on the frame within the trim cover in a spaced relationship from the release seam. In at least this embodiment, the air bag assembly includes an inflator and a folded air bag that is inflated by the inflator to unfold and project outwardly from the seat through the release seam of the trim cover and the vehicle seat assembly further includes an air bag guide including a first inner panel, a second inner panel, and an outer panel, with each of the panels being made of flexible material and having forward and rearward extremities. In at least this embodiment, the rearward extremity of the first inner panel is secured to the air bag assembly, the forward extremity of the second inner panel is secured to the release seam, the forward extremity of the outer panel is secured to the release seam, and the rearward extremity of the outer panel is secured to the trim cover, and the guide further includes a rigid plastic connector assembly for releasably securing the first and second inner panels to each other adjacent the air bag assembly, with the rigid connector comprising at least two releasably connected members, and at least one of the connected members having at least one stop for inhibiting relative lateral movement of the connected members.

In at least one embodiment, the connector assembly comprises a first connector member secured to the first inner panel and a second connector member secured to the second inner panel. In yet another embodiment, the stitching secures each of the connector members to a respective one of the panels.

In at least another embodiment, the first and second connector members interlocking engage each other.

In still yet at least another embodiment, the connector members each comprise at least one J-hook, wherein the connector member each comprise a plurality of J-hooks, wherein the flexible material comprises nylon, and wherein the first inner panel has a length of 10 to 60 cm, the second inner panel has a length of 10 to 80 cm, and the outer panel has a length of 10 to 60 cm.

In yet at least another embodiment, the vehicle seat assembly comprises a frame, a seat pad adjacent the frame, and a trim cover extending over the seat pad and including a release seam adjacent the seat pad, with the trim cover having an outer surface and an inner surface. In at least this embodiment, the vehicle seat assembly further comprises an air bag assembly within the trim cover in a spaced relationship from the release seam, with the air bag assembly including an inflator and a folded air bag that is inflated by the inflator to unfold and project outwardly from the seat through the release seam of the trim cover, and the vehicle seat assembly further comprising an air bag guide including a first inner panel, a second inner panel, and an outer panel. In at least this embodiment, each of the panels is made of flexible material and have forward and rearward extremities, with the rearward extremity of the first inner panel being secured to the air bag assembly, the forward extremity of the second inner panel being secured to the release seam, the forward extremity of the outer panel being secured to the release seam, and the rearward extremity of the outer panel being secured to the trim cover. In at least this embodiment, the seat assembly further comprises a multi-piece rigid plastic connector assembly for releasably securing the first and second inner panels to each other adjacent the air bag assembly, with the rigid plastic connector comprising at least two releasably connected members, and with at least one of the connected members having at least one stop for inhibiting relative lateral movement of the connected members.

In still yet at least another embodiment, the vehicle seat assembly comprises a frame, a seat pad mounted on the frame, a trim cover extending over the seat pad and including a release seam adjacent the seat pad, an air bag assembly mounted on the frame within the trim, with the air bag assembly including an inflator and an air bag that is inflated by the inflator to project outwardly from the seat through the air bag release seam of the trim cover, an air bag guide including a first inner panel, a second inner panel, and an outer panel, and a rigid plastic connector assembly for releasably securing the first and second inner panels to each other adjacent the air bag assembly, wherein the connector assembly comprises a first connector member secured to the first inner panel and a second connector member secured to the second inner panel, wherein the first and second connector members interlocking engage each other, and with at least one of the connector members having spaced apart deformed sections acting as stops to inhibit relative movement of the connector members.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a fragmentary side view of a portion of a seat assembly in accordance with the present invention;

FIG. 2 is a fragmentary sectional view of the seat assembly shown in FIG. 1, taken through line 2-2;

FIG. 4 is a side view showing an embodiment of certain parts of the seat assembly shown in FIG. 1.

DETAILED DESCRIPTION OF THE PREFERRED EMBODIMENT(S)

Figure 3:
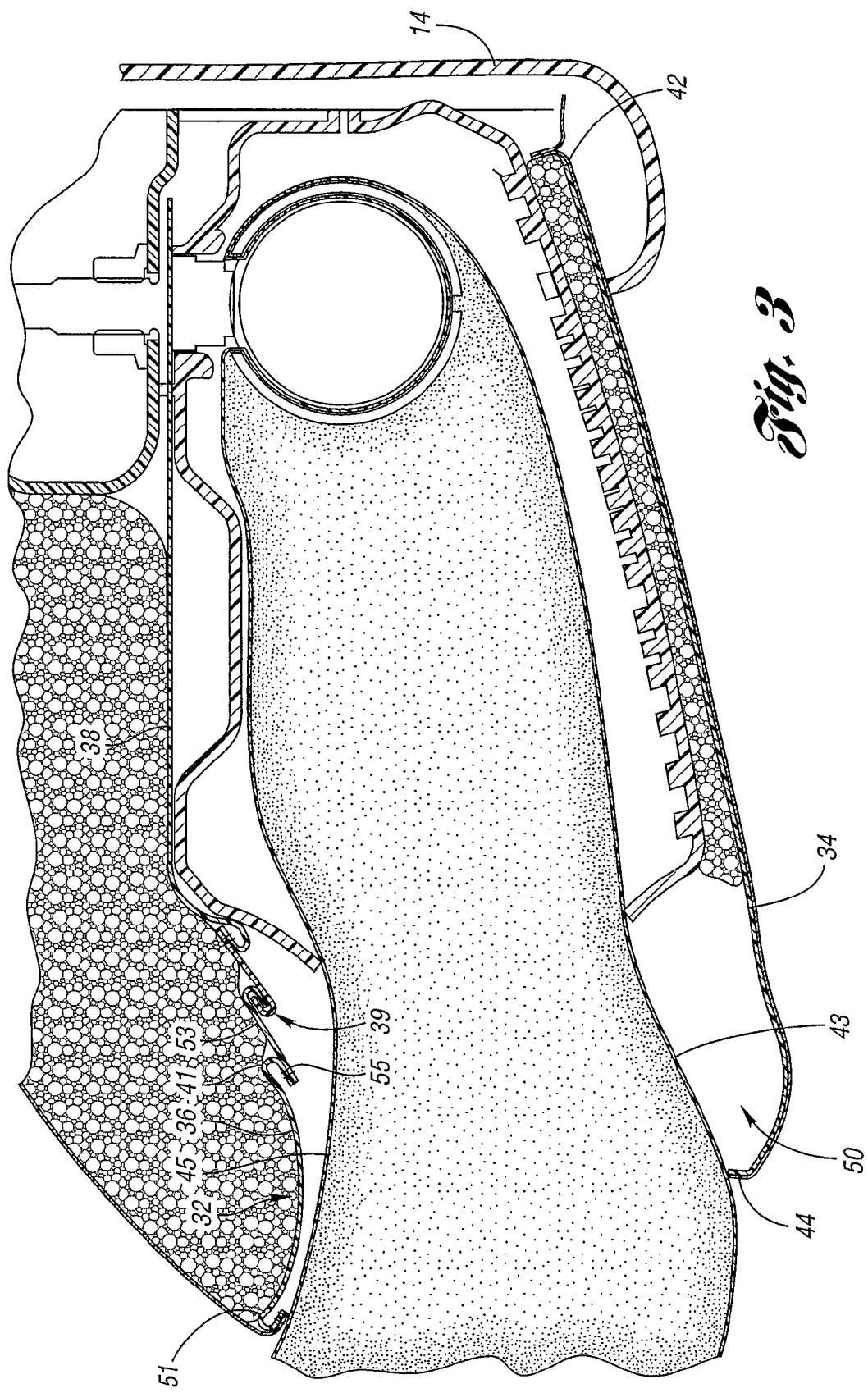
FIG. 3 is a view similar to FIG. 2 showing the parts in a different position.

As required, detailed embodiments of the present invention are disclosed herein. However, it is to be understood that the disclosed embodiments are merely exemplary of the invention that may be embodied in various alternative forms. The figures are not necessarily of scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reactions and/or use are to be understood as modified by the word "about" in describing the broader scope of this invention. Practice within the numerical limits stated is generally preferred. Also, unless expressly stated to the contrary, the description of a group or class of materials as suitable preferred for a given purpose in connection with the invention implies that mixtures of any two or more members of the group or class may be equally suitable or preferred.

FIG. 1 shows a portion of a seat assembly 10 in accordance with the present invention. The seat assembly 10 includes a seat back 12, and seat pad 16 covered by a trim cover 18. As is well known, the seat assembly 16 includes a seat bottom (not shown). The trim cover 18 may be made of any suitable material such as cloth, vinyl or leather, etc. As is shown in FIG. 1, in at least some embodiments, a relatively rigid plastic molding 14 can be provided in the rear area of the seat assembly 10 to provide support and/or for aesthetics.

In at least one embodiment, the seat pad 16 is made from a molded polymeric material, such as a polyurethane foam. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

As shown in FIG. 2, the air bag assembly 20 includes an air bag 22 and an inflator 24, which is configured to supply inflation fluid such as gas to the air bag 22, thereby facilitating deployment of the air bag 22. In at least one embodiment, the air bag assembly 20 also includes a housing 40 which at least partially surrounds the air bag 22 and the inflator 24.

Also shown in FIG. 2 is a portion of a seat frame 26 which can be used for mounting the seat assembly 10 to a vehicle. The seat pad 16 is disposed proximate the frame 26 and air bag assembly 20 and may be directly attached to the frame 26 at various points. The trim cover 18 includes an air bag release seam 28 which in at least one embodiment is adjacent to a side of the seat pad 16.

The air bag assembly 20 is located within the trim cover 18 and may be conventionally mounted, such as on the frame 26, adjacent the air bag release seam 28 but in a spaced relationship from the release seam. The schematically illustrated folded air bag 22, upon deployment, is inflated by inflation fluid from the inflator 24 to unfold and project outwardly from the seat 10 through the air bag release seam 28 of the trim cover 18 (FIG. 3).

With continuing reference to FIG. 2, an air bag guide of the seat back component is generally indicated by 32 and includes an outer panel 34, a first inner panel 36, and a second inner panel 38 that are each made of any suitable material effective to protect the seat pad 16 during deployment of the air bag 22. For example, the panels 34, 36 and 38 may be made of a woven or non-woven cloth material, which may include natural or synthetic materials such as nylon. One material that is found to be effective is a polyester material, of the type from which the air bag 22 may be manufactured. The outer panel 34 can optionally be omitted if the material strength of the inner panels 36 and 38 are sufficient to prevent excessive stretching during deployment.

The outer panel 34 of the air bag guide 32 includes an inner extremity 42 that is attached suitably to the trim cover 18 at a location spaced rearward of the tear seam 28. The outer extremity 44 of the outer panel 34 is attached to a first end of the tear seam 28. In at least one embodiment, the outer panel 34 has a length of 10 to 60 cm, a width of 5 to 25 cm, and a thickness of 0.5 to 5 mm. In at least another embodiment, the outer panel 34 has a length of 15 to 50 cm, and in yet another embodiment of 20 to 40 cm. In at least another embodiment, the outer panel 34 has a width of 7.5 to 20 cm, and in yet another embodiment of 9 to 20 cm. In at least another embodiment, the outer panel 34 has a thickness of 1 to 4 mm. The outer panel 34 may have any suitable size and/or shape and in one embodiment has a trapezoidal shape decreasing in length as it extends towards the tear seam 28.

The outer extremity 51 of the second inner panel 36 is attached to a second end of the tear seam 28, opposite the first end of the tear seam. The second inner panel 36 of the air bag guide 32 includes an inner extremity 41 that is attached to at least one J-hook section 53 at a location spaced between the tear seam 28 and the second inner panel 38. In at least one embodiment, the second inner panel 36 has a length of 10 to 60 cm, a width of 5 to 25 cm, and a thickness of 0.5 to 5 mm. In at least another embodiment, the second inner panel 36 has a length of 15 to 50 cm, and in yet another embodiment of 20 to 40 cm. In at least another embodiment, the second inner panel 36 has a width of 7.5 to 20 cm, and in yet another embodiment of 9 to 20 cm. In at least another embodiment, the first inner panel 36 has a thickness of 1 to 4 mm. The second inner panel 36 may have any suitable size and/or shape and in one embodiment has a trapezoidal shape decreasing in length as it extends towards the tear seam 28.

The J-hook section 53 can be secured to the inner extremity 41 of the second inner panel 36 in any suitable manner. For instance, the J-hook section 53 can be attached to the second inner panel 36 via ultrasonic welding, adhesive, etc., among other suitable manners. In at least the illustrated embodiment, stitching 55 secures the J-hook section 39 to the first inner panel 36. Also, in one embodiment, the J-hook section 53 could be secured to the first inner panel 36 of the air bag guide 32 via in situ molding of the polymeric seat pad 16.

The first inner panel 38 extends generally between the housing 40 and the second inner panel 36. In at least this illustrated embodiment, the inner extremity 71 of the first inner panel 38 is secured to the housing 40, via bolt 61. In at least one embodiment, the first inner panel 38 extends 10 to 80 cm in length, 3 to 20 cm in width, and is 0.5 to 5 mm in thickness. In at least another embodiment, the first inner panel 38 has a length of 15 to 50 cm, and in yet another embodiment of 20 to 40 cm. In at least another embodiment, the first inner panel 38 has a width of 7.5 to 20 cm, and in yet another embodiment of 9 to 20 cm. In at least another embodiment, the first inner panel 38 has a thickness of 1 to 4 mm. The first inner panel 38 may have any suitable size and/or shape and in one embodiment has a trapezoidal shape decreasing in length as it extends towards the tear seam 28.

The outer extremity 81 of the first inner panel 38 is attached to at least one J-hook section 39 that interlocks with the J-hook section 53 on the second inner panel 36 to releasably secure the first inner panels 36 and 38 to each other. The J-hook sections 39 and 53 facilitate assembly of the trim cover 18 and thus the seat assembly 10.

In at least one embodiment, the J-hook sections 53 and 39 comprises one J-hook. In at least another embodiment, the J-hook sections 53 and 39 comprise a plurality of J-hooks, such as 2-8 J-hooks. The J-hook sections 39 and 53 enable cover 18 to be readily assembled and disassembled if desired. Using a plurality of J-hook sections 39 and 53 also enable several concentrated tear propagations by concentrating forced on localized areas of the seam 28.

The J-hook section 39 can be secured to the first inner panel 38 in any suitable manor. Exemplary manners are discussed above with respect to J-hook section 53 and the second inner panel 36. In at least another embodiment, the J-hook section 39 could be secured to the first inner panel 38 in any suitable manner, such as by sewing, ultrasonic welding, and adhesive.

In at least one embodiment, the J-hook sections 39 and 53 each have a general thickness of 0.5 to 5 mm (millimeters), in other embodiments of 0.75 to 3.5 mm, and in yet other embodiments of 1.0 to 2.0 mm.

In at least one embodiment, the J-hook sections 39 and 53 each have a length of 250 to 500 mm, in other embodiments of 300 to 450 mm, and in yet other embodiments of 350 to 400 mm. In at least one embodiment, the J-hook sections 39 and 53 each have a length of 25 to 150 mm, in other embodiments of 40 to 125 mm, and in yet other embodiments of 50 to 100 mm.

As best shown in FIG. 4, J-hook section 39 has stops 62 disposed at opposed ends. The stops 62 help to inhibit relative lateral movement of the J-hook sections 39 and 53. The stops 62 can be spaced any where along the length of the J-hook section 39. Moreover, stops 62 could be placed on J-hook section 53 either in addition to, or alternatively to, J-hook section 39. The stops 62 can constitute any suitable structure for inhibiting relative movement between sections 39 and 53, such as clips, thicker sections, roughened surfaces, and/or crimps, but in at least one embodiment comprise crushed areas that limit relative movement of the sections 39 and 53. While the stops 62 may be spaced apart any suitable distance, in at least one embodiment the are spaced apart 0.75 to 7 cm, in another embodiment 1 to 6 cm and in yet another embodiment 2 to 5 cm. In at least one embodiment, only one stop 62 is present.

In at least one embodiment, the air bag guide 32 is effective to prohibit at least substantially all contact between the deploying air bag 22 and the seat pad 16. This can help to prevent energy loss from the air bag 22 by decreasing friction and protecting the seat pad 16 from damage. This, in turn, can also help to reduce the deployment time for the air bag 22 and/or the amount of inflation fluid required to deploy the air bag. The air bag guide 32 also help to provide a reliable predetermined exit path essentially to the tear seam 28 and inhibit the air bag 22 from traveling under the seat cover 18 to the inboard area of the seat assembly 10.

In at least one embodiment, the outer and inner panels 34, 36 and 38 of the air bag guide 32 form a deployment channel 50 for the air bag 22. As shown in FIGS. 2-3, the deployment channel 50 is oriented to facilitate deployment of the air bag 22 through the seam 28 in the trim cover 18.

Upon deployment of the air bag assembly 20, as shown schematically in FIG. 3, the deploying air bag 22 causes relative movement of the flexible outer panel 34 and inner panels 36 and 38 away from each other which then provide a guiding function of the unfolding air bag 22 as it moves between the panels toward the air bag release seam 28 and eventually tears open the release seam for outward projection of the air bag to provide the occupant protection. Furthermore, as the air bag 22 deploys through the deployment channel 50, the air bag guide 32 acts as a blocking member that forms a barrier on two sides 43, 45 of the air bag 22, thereby inhibiting contact between the air bag 22 and the seat pad 16. Thus, the seat pad 16 is moved away from the air bag 22 as it deploys through the deployment channel 50.

As shown in FIG. 3, the attachment of the outer extremities 44, 51 of the panels 34 and 36 to opposed ends of the seam 28 helps to facilitate deployment of the air bag 22 through the seam 28. This is because the deployment channel 50 opens as the air bag 22 is deployed and directs the deploying air bag 22 to exert an outward force on the trim cover 18 at the seam 28; this helps to open the seam 28 to provide an easy exit for the air bag 22. Also the panels 34, 36 and 38 help to ensure that the air bag 22 will deploy in the predetermined desired manner through the seam 18 by providing a continuous barrier attached to one side of the seam 28.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
a frame;
a seat pad adjacent the frame;
a trim cover extending over the seat pad and including a release seam adjacent the seat pad;
an air bag assembly mounted on the frame within the trim cover in a spaced relationship from the release seam, the air bag assembly including an inflator and a folded air bag that is inflated by the inflator to unfold and project outwardly from the seat through the release seam of the trim cover; and
an air bag guide including a first inner panel, a second inner panel, and an outer panel, each of the panels being made of flexible material and having forward and rearward extremities, the rearward extremity of the first inner panel being secured to the air bag assembly, the forward extremity of the second inner panel being secured to the release seam, the forward extremity of the outer panel being secured to the release seam, and the rearward extremity of the outer panel being secured to the trim cover; and
a rigid plastic connector assembly for releasably securing the first and second inner panels to each other adjacent the air bag assembly, the rigid connector comprising at least two releasably connected members, at least one of the connected members having at least one stop for inhibiting relative lateral movement of the connected members.

2. The vehicle seat assembly of claim 1, wherein the connector assembly comprises a first connector member secured to the first inner panel and a second connector member secured to the second inner panel.

3. The vehicle seat assembly of claim 2, wherein stitching secures each of the connector members to a respective one of the panels.

4. The vehicle seat assembly of claim 1, wherein the first and second connector members interlocking engage each other.

5. The vehicle seat assembly of claim 4, wherein the connector members each comprise at least one J-hook.

6. The vehicle seat assembly of claim 4, wherein the connector member each comprise a plurality of J-hooks.

7. The vehicle seat assembly of claim 1, wherein the flexible material comprises nylon.

8. The vehicle seat assembly of claim 1, wherein the first inner panel has a length of 10 to 60 cm, the second inner panel has a length of 10 to 80 cm, and the outer panel has a length of 10 to 60 cm.

9. A vehicle seat assembly, comprising:
a frame;
a seat pad adjacent the frame;
a trim cover extending over the seat pad and including a release seam adjacent the seat pad, the trim cover having an outer surface and an inner surface;
an air bag assembly within the trim cover in a spaced relationship from the release seam, the air bag assembly including an inflator and a folded air bag that is inflated by the inflator to unfold and project outwardly from the seat through the release seam of the trim cover; and
an air bag guide including a first inner panel, a second inner panel, and an outer panel, each of the panels being made of flexible material and having forward and rearward extremities, the rearward extremity of the first inner panel being secured to the air bag assembly, the forward extremity of the second inner panel being secured to the release seam, the forward extremity of the outer panel being secured to the release seam, and the rearward extremity of the outer panel being secured to the trim cover; and
a multi-piece rigid plastic connector assembly for releasably securing the first and second inner panels to each other adjacent the air bag assembly, the rigid plastic connector comprising at least two releasably connected members, at least one of the connected members having at least one stop for inhibiting relative lateral movement of the connected members.

10. The vehicle seat assembly of claim 9, wherein the connector assembly comprises a first connector member secured to the first inner panel and a second connector member secured to the second inner panel.

11. The vehicle seat assembly of claim 10, wherein the first and second connector members interlocking engage each other.

12. The vehicle seat assembly of claim 11, wherein the connector members each comprise at least one J-hook.

13. The vehicle seat assembly of claim 12, wherein the connector member each comprise a plurality of J-hooks.

14. The vehicle seat assembly of claim 13, wherein the flexible material comprises nylon.

15. The vehicle seat assembly of claim 14, wherein the first inner panel has a length of 20 to 40 cm, the second inner panel has a length of 20 to 40 cm, and the outer panel has a length of 20 to 40 cm.

16. The vehicle seat assembly of claim 11, wherein the first and second connector members each comprise a plurality of J-hooks.

17. A vehicle seat assembly, comprising:
a frame;
a seat pad mounted on the frame;
a trim cover extending over the seat pad and including a first end joined to a second end to form a release seam adjacent the seat pad;
an air bag assembly mounted on the frame within the trim, the air bag assembly including an inflator and an air bag that is inflated by the inflator to project outwardly from the seat through the air bag release seam of the trim cover;
an air bag guide including a first inner panel, a second inner panel, and an outer panel, each of the panels being made of flexible material and having forward and rearward extremities, the rearward extremity of the first inner panel being secured to the air bag assembly, the forward extremity of the second inner panel being secured to the first end of the release seam, the forward extremity of the outer panel being secured to the second end of the release seam, and the rearward extremity of the outer panel being secured to the trim cover; and
a rigid plastic connector assembly for releasably securing the first and second inner panels to each other adjacent the air bag assembly;
wherein the connector assembly comprises a first connector member secured to the first inner panel and a second connector member secured to the second inner panel;
wherein the first and second connector members interlocking engage each other, at least one of the connector members having spaced apart deformed sections acting as stops to inhibit relative movement of the connector members.

18. The vehicle seat assembly of claim 17, wherein the connector members each comprise at least one J-hook the air bag guide capable of guiding the air bag, upon deployment, between the inner panels and the outer panel.

19. The vehicle seat assembly of claim 17, wherein the connector member each comprise a plurality of J-hooks.

20. The vehicle seat assembly of claim 17, wherein the first inner panel has a length of 10 to 60 cm, the second inner panel has a length of 10 to 80 cm, and the outer panel has a length of 10 to 60 cm.

* * * * *